United States Patent
Ohira et al.

(10) Patent No.: US 8,685,587 B2
(45) Date of Patent: Apr. 1, 2014

(54) GAS-LIQUID SEPARATOR FOR FUEL CELL SYSTEM

(75) Inventors: Junko Ohira, Tsushima (JP); Yasunari Arai, Takahama (JP); Akishi Morita, Aichi-ken (JP); Nobuhiko Nakagaki, Nagoya (JP); Takeshi Asai, Nisshin (JP); Hiroyuki Sekine, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 686 days.

(21) Appl. No.: 12/334,854

(22) Filed: Dec. 15, 2008

(65) Prior Publication Data

US 2009/0162730 A1   Jun. 25, 2009

(30) Foreign Application Priority Data

Dec. 25, 2007 (JP) .................................. 2007-332306

(51) Int. Cl.
*H01M 2/14* (2006.01)
*H01M 8/04* (2006.01)
*H01M 2/00* (2006.01)

(52) U.S. Cl.
USPC ........... 429/457; 429/456; 429/508; 429/512; 429/514; 429/443; 429/515; 429/516; 429/532

(58) Field of Classification Search
None
See application file for complete search history.

(56) References Cited

U.S. PATENT DOCUMENTS

| | | | |
|---|---|---|---|
| 6,428,915 B1 * | 8/2002 | Ban et al. ..................... | 429/450 |
| 6,899,741 B2 * | 5/2005 | Nakamura et al. ............. | 48/61 |
| 7,163,199 B2 * | 1/2007 | Tanaka ......................... | 261/153 |
| 8,241,806 B2 | 8/2012 | Ichikawa et al. | |
| 2005/0058862 A1 * | 3/2005 | Sone et al. ..................... | 429/22 |
| 2006/0222923 A1 * | 10/2006 | Muramatsu et al. ............ | 429/34 |
| 2011/0313606 A1 * | 12/2011 | Yoshida et al. ................ | 701/22 |

FOREIGN PATENT DOCUMENTS

| | | | | |
|---|---|---|---|---|
| JP | 7-16973 | 7/1995 | | |
| JP | 2006-32134 | 2/2006 | | |
| JP | 2006-032134 | * 2/2006 | ............. | H01M 8/04 |
| JP | 2006-049100 | * 2/2006 | ............. | H01M 8/04 |
| JP | 2006-049100 A | 2/2006 | | |
| JP | 2006-147440 | 6/2006 | | |
| JP | 2007-280771 | 10/2007 | | |

(Continued)

OTHER PUBLICATIONS

English language Abstract of JP 2006-049100 A.

(Continued)

*Primary Examiner* — Barbara Gilliam
*Assistant Examiner* — Angela Martin
(74) *Attorney, Agent, or Firm* — Greenblum & Bernstein P.L.C.

(57) ABSTRACT

A discharge port is located at a lower portion of the case of a gas-liquid separator. A discharge valve is located at the discharge port. A water retaining portion is located at the bottom of the case. The water retaining portion is located at a position lower than the discharge valve. An upward inclination surface is formed on the bottom of the water retaining portion. The upward inclination surface is inclined upward toward the discharge valve. A downward inclination surface is formed on the bottom of the water retaining portion. The downward inclination surface is inclined downward toward the upward inclination surface. A cover portion is located in an upper portion of the water retaining portion. The cover portion defines a gas passage in an upper portion of the water retaining portion. The gas passage is open at a portion closer to the inlet and connected to the discharge valve.

9 Claims, 5 Drawing Sheets

(56) References Cited

FOREIGN PATENT DOCUMENTS

| JP | 2008-177129 | 7/2008 |
| JP | 2009-104966 | 5/2009 |
| JP | 2009-110840 | 5/2009 |
| WO | 2008/090430 | 7/2008 |
| WO | WO 2008/090430 A1 * | 7/2008 | .............. H01M 8/04 |

OTHER PUBLICATIONS

Japan Office action, mail date is Aug. 7, 2012.

* cited by examiner

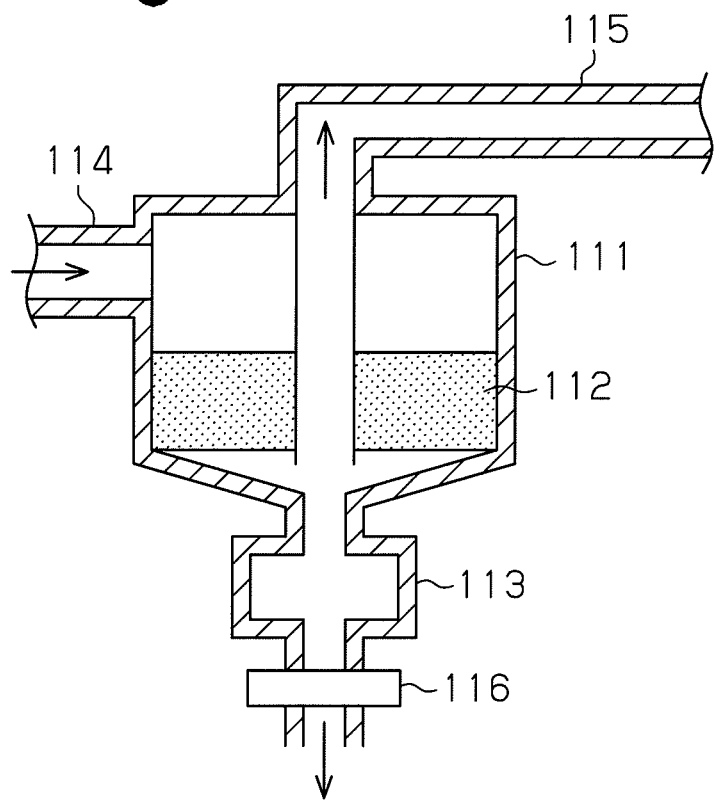

GAS-LIQUID SEPARATOR FOR FUEL CELL SYSTEM

BACKGROUND OF THE INVENTION

The present invention relates to a gas-liquid separator that separates unreacted excess hydrogen discharged from a cell stack and product water from each other in a fuel cell system.

A typical fuel cell system has a gas-liquid separator located between the hydrogen outlet and the hydrogen inlet of the cell stack. Unreacted excess hydrogen and product water discharged from the cell stack are separated by a gas-liquid separator, so that the unreacted hydrogen is recovered to the cell stack and reused. The product water is discharged to the outside.

Conventionally, for example, Japanese Laid-Open Patent Publication No. 2006-49100 discloses such a gas-liquid separate used in such a fuel cell system. That is, as shown in FIG. 9, the gas-liquid separator 111 has ion-exchange resin 112 and a tank 113 located below the resin 112. As the fuel cell system starts operating, hydrogen and product water discharged from the hydrogen outlet of the cell stack are conducted to the gas-liquid separator 111 through a circulation passage 114. The hydrogen and product water are separated at the ion-exchange resin 112, and the hydrogen is sent to the cell stack to be reused through a circulation passage 115. The separated product water is received in the tank 113, and discharged to the outside when a discharge valve 116 is open.

In the gas-liquid separator of Japanese Laid-Open Patent Publication No. 2006-49100, the discharge valve 116 is located below the tank 113 so that product water in the tank 113 can be discharged. When the fuel cell system is stopped, product water collected on the inner walls of the case of the gas-liquid separator 111 and product water remaining in the ion-exchange resin 112 drips and is stored in the tank 113. When the fuel cell system is in the stopped state under a low-temperature environment, for example, in winter, such product water in the tank 113 may be frozen. In such a case, even when the fuel cell system is activated, the frozen water may hinder the opening and closing of the discharge valve 116, and discharge of product water to the outside may be impossible. In some cases, the frozen water may damage the discharge valve 116.

SUMMARY OF THE INVENTION

Accordingly, it is an objective of the present invention to provide a gas-liquid separator that is capable of allowing a discharge valve to operate normally even if product water dripped from the inner surfaces of a case and ion-exchange resin is frozen during the stopped state of a fuel cell system under a low-temperature environment.

To achieve the foregoing objective and in accordance with one aspect of the present invention, a gas-liquid separator of a fuel cell system is provided. The gas-liquid separator includes an inlet connected to a hydrogen discharge portion of a cell stack of the fuel cell system, an outlet connected to a hydrogen introduction portion of the cell stack, a product water separating member located between the inlet and the outlet, and a discharge port located below the product water separating member. The discharge port is used to discharge product water. The gas-liquid separator further includes a discharge valve for opening and closing the discharge port, a water retaining portion located at a position lower than the discharge valve, and a discharge portion. The water retaining portion is continuous to the discharge port. The discharge portion discharges product water retained in the water retaining portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 9 is a cross-sectional view showing a prior art.

DETAILED DESCRIPTION OF THE PREFERRED EMBODIMENTS

Figure 1:
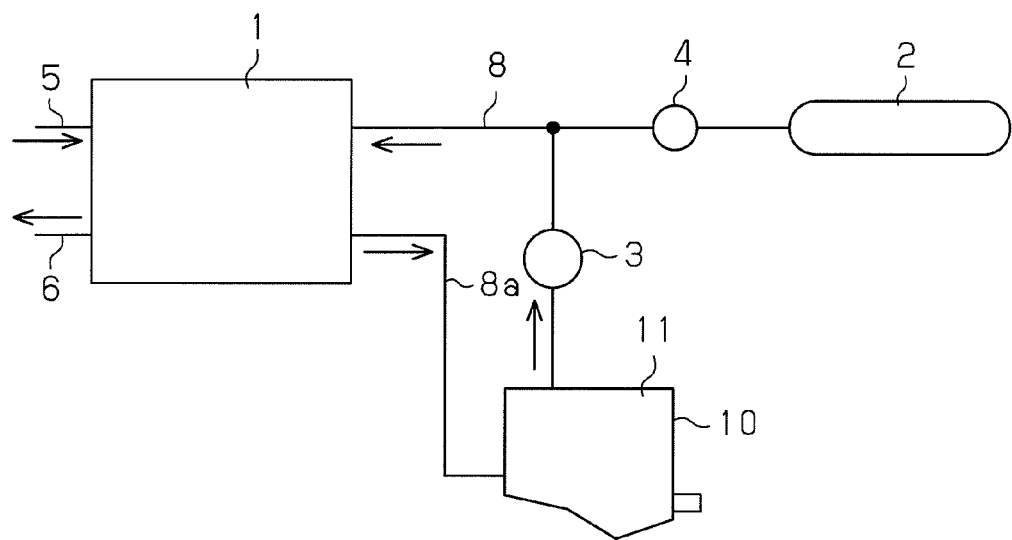
FIG. 1 is a diagram showing a fuel-cell system.
Figure 2:
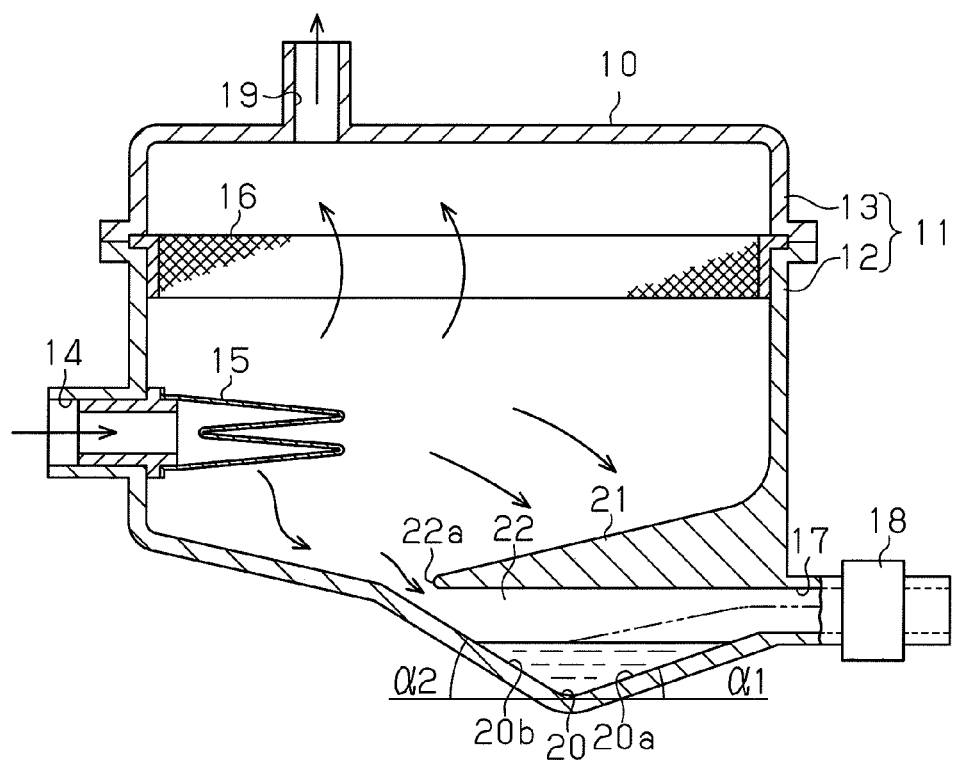
FIG. 2 is a cross-sectional view illustrating a gas-liquid separator according to a first embodiment.

A first embodiment of the present invention will now be described with reference to FIGS. 1 and 2.

First, a fuel cell system will be roughly described with reference to FIG. 1. A cell stack 1 includes a plurality of single cells (not shown) and performs cell reaction. An air supply passage 5 is connected to the cell stack 1 to supply air, which is oxidation gas. Also, an air discharge passage 6 is connected to the cell stack 1 to discharge air and product water from the cell stack 1. A hydrogen discharge portion (not shown) and a hydrogen introduction portion (not shown) of the cell stack 1 are connected to one end and the other end of a circulation path 8a forming a hydrogen circuit 8, respectively.

Of unreacted excess hydrogen (gas) and product water discharged from the cell stack 1, the circulation path 8a circulates the hydrogen and supplies the hydrogen, together with new hydrogen, to the cell stack 1. The circulation path 8a discharges the product water to the outside. A circulation pump 3, a gas-liquid separator 10, a hydrogen tank 2, and a pressure-regulating valve 4 are provided in the hydrogen circulation path 8a. The circulation pump 3 applies circulating force to fluid in the circulation path 8a. The gas-liquid separator 10 receives hydrogen and product water from the cell stack 1 through the circulation path 8a, separates the hydrogen and product water. The hydrogen tank 2 supplies new hydrogen to the cell stack. The pressure-regulating valve 4 regulates the pressure of hydrogen supplied from the hydrogen tank 2 to the cell stack.

The gas-liquid separator 10 will now be described. As shown in FIG. 2, the case 11 of the gas-liquid separator 10 is formed of a lower case member 12, which has a closed lower end and an open upper end, and an upper case member 13, which has an open lower end and a closed upper end. An inlet 14 is formed in a peripheral wall of the lower case member 12.

The inlet 14 conducts gas-liquid mixture containing hydrogen and product water discharged from the cell stack 1 into the case 11. A filter 15 is attached to the inner opening of the inlet 14. The filter 15 is made of woven fabric or nonwoven fabric, and removes foreign matter from hydrogen and product water drawn into the case 11.

In the case 11, ion-exchange resin 16 is located between the lower case member 12 and the upper case member 13. The ion-exchange resin 16 serves as a product water separating member portion, which separates gas-liquid mixture supplied through the inlet 14 into hydrogen and product water. A discharge port 17 is formed in a lower portion of the peripheral wall of the lower case member 12, at a position opposite to the inlet 14. The discharge port 17 discharges separated product water to the outside along a substantially horizontal direction. An electromagnetic discharge valve 18 is located in the discharge port 17. Opening and closing of the discharge valve 18 is controlled by a control circuit (not shown).

An outlet 19 is formed in the upper wall of the upper case member 13, at a position opposite to the discharge port 17 with respect to the ion-exchange resin 16. The outlet 19 discharges the separated hydrogen and supplies the hydrogen to the cell stack 1.

A water retaining portion 20 is formed in the bottom of the lower case member 12, at a position below the discharge valve 18. The water retaining portion 20 has a storage capacity capable of retaining product water that drips from the inner wall of the case 11 and the ion-exchange resin 16 during the stopped state of the fuel cell system. Specifically, the capacity of the water retaining portion 20 is set to such a value that, when a maximum credible amount of dripped product water is stored in the water retaining portion 20, the level of the water is below the discharge valve 18.

An upward inclination surface 20a is formed in a portion of the bottom of the water retaining portion 20 closer to the discharge valve 18. The upward inclination surface 20a is inclined upward from the side closer to the inlet 14 toward the discharge valve 18. Also, a downward inclination surface 20b is formed in a portion of the bottom of the water retaining portion 20 closer to the inlet 14. The downward inclination surface 20b is inclined downward from the side closer to the inlet 14 toward the upward inclination surface 20a. The inclination angle $\alpha 1$ of the upward inclination surface 20a relative to the horizontal plane is less than the inclination angle $\alpha 2$ of the downward inclination surface 20b relative to the horizontal plane. In the present embodiment, the inclination angle $\alpha 1$ of the upward inclination surface 20a is 20 degrees, and the inclination angle $\alpha 2$ of the downward inclination surface 20b is 30 degrees.

A cover portion 21 that covers the upper portion of the water retaining portion 20 is formed on the inner surface of the lower case member 12. The cover portion 21 defines a gas passage 22 in an upper portion of the water retaining portion 20. The gas passage 22 has an opening 22a at a position closer to the inlet 14, and is connected to the discharge valve 18. The gas passage 22, the upward inclination surface 20a, and the downward inclination surface 20b form a discharge portion. When the discharge valve 18 is open and hydrogen is supplied into the case 11 through inlet 14, the hydrogen flows into the gas passage 22 through the opening 22a.

An operation of the gas-liquid separator 10 thus constructed will now be described.

When the fuel cell system having the gas-liquid separator 10 is operated, the pump 3 is activated. This supplies unreacted hydrogen and product water discharged from the cell stack 1 to the case 11 of the gas-liquid separator 10 through the inlet 14. Then, the ion-exchange 16 separates the hydrogen and the product water in the case 11. The hydrogen is sent to the circulation path 8a through the outlet 19 to be supplied to and reused in the cell stack 1.

In contrast, the separated product water drips from the ion-exchange resin 16 and moves to the water retaining portion 20 of the lower case member 12 via the opening 22a to be retained there. During the operation of the fuel cell system, the discharge valve 18 is opened at a predetermined interval. Also, during the operation of the fuel cell system, the pressure in the circulation path 8a, which includes the gas-liquid separator 10, is maintained at a high level by the circulation pump 3. Thus, when the discharge valve 18 is opened, hydrogen is spurted through the inlet 14 and flows into the gas passage 22 through the opening 22a. The hydrogen then quickly flows through the gas passage 22. The momentum of the hydrogen flow moves the product water in the water retaining portion 20 toward the discharge valve 18 in a drifting manner. Further, the hydrogen flow waves the surface of the water retaining portion 20 or increases the level of the water as indicated by chain double-dashed line in FIG. 2, so that the opening area of the gas passage 22 is reduced. This further increases the velocity of the hydrogen flow. In this state, the hydrogen flows at a high velocity from the downward inclination surface 20b to the upward inclination surface 20a, while sweeping the product water.

Almost the whole product water in the water retaining portion 20 is instantly discharged to the outside through the discharge port 17 and the discharge valve 18. The discharge valve 18 is closed when the product water is discharged. The open time of the discharge valve 18 is relatively short and the same as the time required for discharging the product water. Since the circulation pump 3 is connected to the downstream side of the outlet 19, backflow of hydrogen from downstream of the circulation pump 3 is prevented. Therefore, when the discharge valve 18 is open, little hydrogen is spurted into the case 11 from the outlet 19.

Thereafter, when the fuel cell system is stopped, the discharge valve 18 is opened for a short time as described above. The timing at which the discharge valve 18 is opened may be immediately before, simultaneous with, or immediately after stopping of the fuel cell system. As in the case described above, the opening of the discharge valve 18 causes hydrogen to quickly move from the inlet 14 into the gas passage 22 through the opening 22a, and the product water in the water retaining portion 20 is instantly discharged.

Since the filter 15 is provided at the inlet 14, foreign matter contained in hydrogen and product water is removed by the filter 15. This prevents foreign matter from clogging the ion-exchange resin 16. The gas-liquid separation efficiency is therefore maintained. Also, since foreign matter is not incorporated in the product water in the water retaining portion 20, the discharge valve 18 is prevented from being clogged.

As described above, the product water in the water retaining portion 20 is discharged during the stopped state of the fuel cell system, which empties the water retaining portion 20. Thus, even if product water drips from the inner wall of the case and the ion-exchange resin 16 after the fuel cell system is stopped, the dripped water is retained in the water retaining portion 20 and does not enter the discharge valve 18.

The first embodiment has the following advantages.

(1) During the stopped state of the fuel cell system under a low-temperature environment, even if product water that has dripped from the inner wall of the case 11 and the ion-exchange resin 16 is frozen, the discharge valve 18 is operated normally without being incapable of opening and closing. When starting the fuel cell system, the discharge valve 18 is operated to open and close without any trouble. Thus, when the fuel cell system restarted, discharge failure does not occur. Further, the discharge valve 18 is prevented from being damaged by frozen water.

(2) To prevent the discharge valve 18 from being frozen, the water retaining portion 20 and the gas passage 22 are simply formed in the case 11. No dedicated component, such as a suction pump to draw in dripped product water is provided. This simplifies the structure.

(3) The water retaining portion 20 includes the downward inclination surface 20b formed at a portion closer to the inlet 14 and the upward inclination surface 20a formed at a portion closer to the discharge port 17. Therefore, when the discharge valve 18 is opened and hydrogen starts being supplied into the case 11, the momentum of the hydrogen smoothly moves the product water in the water retaining portion 20 along the upward inclination surface 20a toward the discharge valve 18. The product water in the water retaining portion 20 is thus discharged out of the discharge valve 18, and the water retaining portion 20 is emptied. Gas that is supplied to the case 11 through the inlet 14 is directed to the product water in the water retaining portion 20 along the downward inclination surface 20b. The product water in the water retaining portion 20 is thus reliably discharged through the discharge valve 18. Further, the inclination angle α1 of the upward inclination surface 20a relative to the horizontal plane is less than the inclination angle α2 of the downward inclination surface 20b relative to the horizontal plane. This allows the product water in the water retaining portion 20 to be smoothly swept toward the discharge port 17 by the flow of hydrogen.

A second embodiment of the present invention will now be described. The differences from the first embodiment will mainly be discussed in the second and subsequent embodiments and modifications below.

Figure 3:
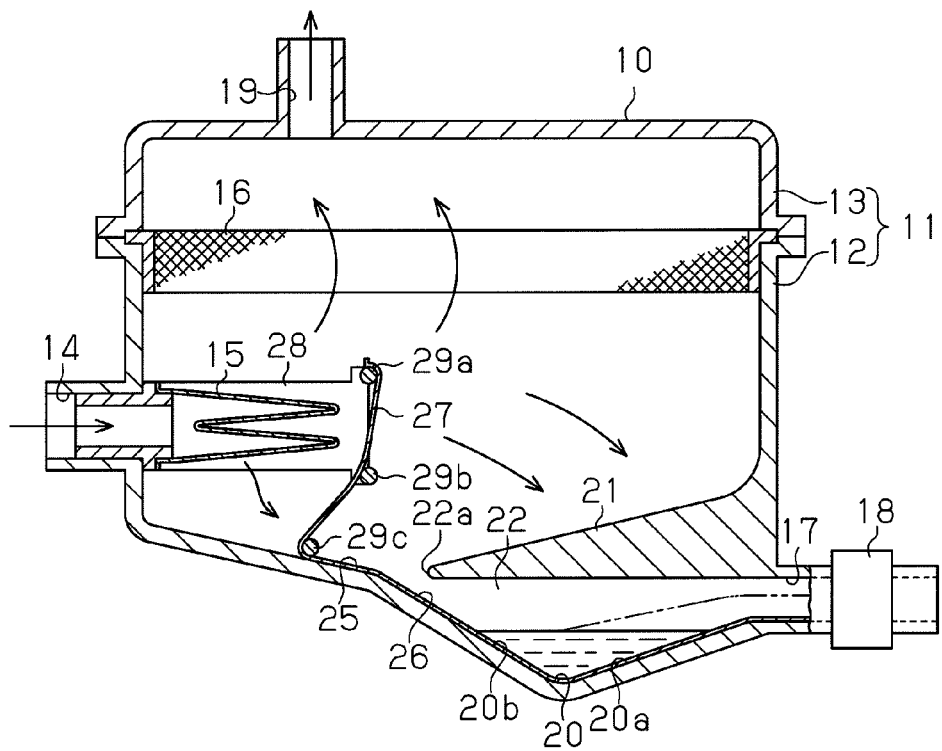
FIG. 3 is a cross-sectional view illustrating a gas-liquid separator according to a second embodiment.
Figure 4:
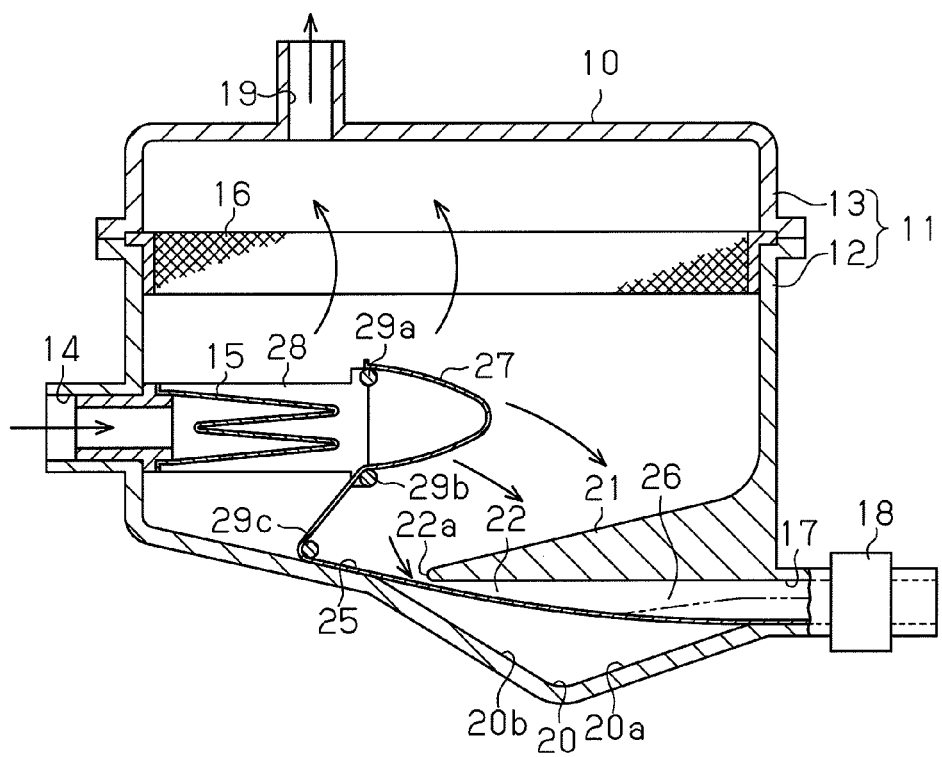
FIG. 4 is a cross-sectional view showing an operating state of the gas-liquid separator of FIG. 3.
Figure 5:
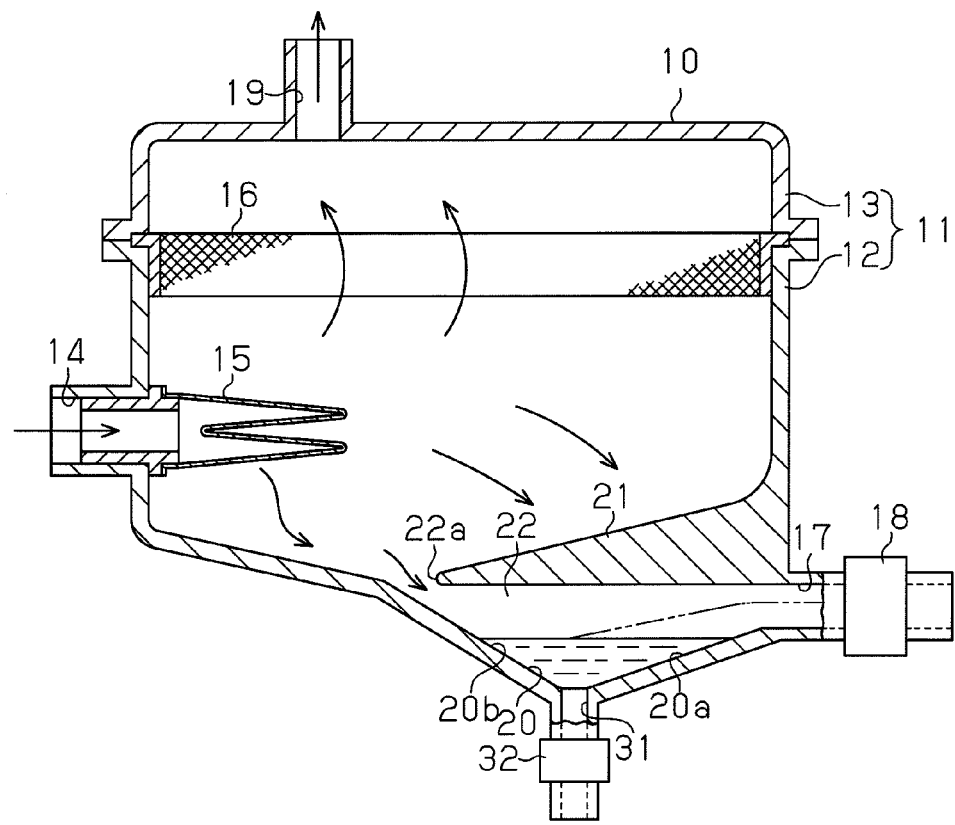
FIG. 5 is a cross-sectional view illustrating a gas-liquid separator according to a third embodiment.

In the second embodiment, a forcing mechanism 25 is provided at the bottom of the water retaining portion 20 as shown in FIGS. 3 and 4. That is, a water impermeable sheet 26 is laid on the inner bottom surface of the water retaining portion 20. In the lower case member 12, an air impermeable pressure receiving ribbon 27 is provided at the downstream side of the filter 15. The pressure receiving ribbon 27 is supported with a support frame 28 and guide rollers 29a, 29b, 29c. One end of the pressure receiving ribbon 27 is integrally connected to the sheet 26.

When the discharge valve 18 is closed, that is, when hydrogen is not being spurted through the inlet 14, the sheet 26 is laid on and conforms to the shape of the bottom surface of the water retaining portion 20 due to the own weight as shown in FIG. 3. Thus, product water that drips from the ion-exchange resin 16 and the inner wall of the case 11 is retained on the sheet 26 in the water retaining portion 20. In contrast, when the discharge valve 18 is open and hydrogen is spurted through the inlet 14, the pressure receiving ribbon 27 receives the spurting pressure of the hydrogen from the inlet 14, and is curved to bulge inward of the case 11. The bulging pulls the sheet 26 toward the inlet 14, so that the sheet 26 is tense. This pulls up the sheet 26 from the bottom of the water retaining portion 20, and force toward the discharge valve 18 is applied to the product water on the sheet 26.

Thus, as in the case of the first embodiment, the momentum of the hydrogen flow from the opening 22a into the gas passage 22 generates force that moves the product water on the sheet 26 in the water retaining portion 20 toward the discharge valve 18. At the same time, the tension of the sheet 26 generates a force that send the product water toward the discharge valve 18.

In addition to the advantages (1) and (3) of the first embodiment, the second embodiment provides the following advantage.

(4) The product water in the water retaining portion 20 is positively moved toward the discharge valve 18 by means of the sheet 26, so that the water retaining portion 20 is more reliably emptied. Therefore, after the fuel cell system is stopped, dripped product water can be retained in the water retaining portion 20 without overflowing.

A third embodiment of the present invention will now be described.

According to the third embodiment, a drain port 31, which serves as a drain portion, is provided at the bottom of the water retaining portion 20. An electromagnetic drain valve 32 is located in the drain port 31. When the fuel cell system is stopped, the drain valve 32 is opened, so that product water in the water retaining portion 20 is discharged to the outside through the drain port 31 and the water retaining portion 20 is emptied.

The third embodiment provides the same advantages as the advantages (1) and (3) of the first embodiment.

In addition, the third embodiment provides the following advantage.

(5) Since the product water in the water retaining portion 20 is moved downward and discharged, the water retaining portion 20 is more reliably emptied.

The present invention is not limited to the above illustrated embodiments, but may be modified as follows.

Figure 6:
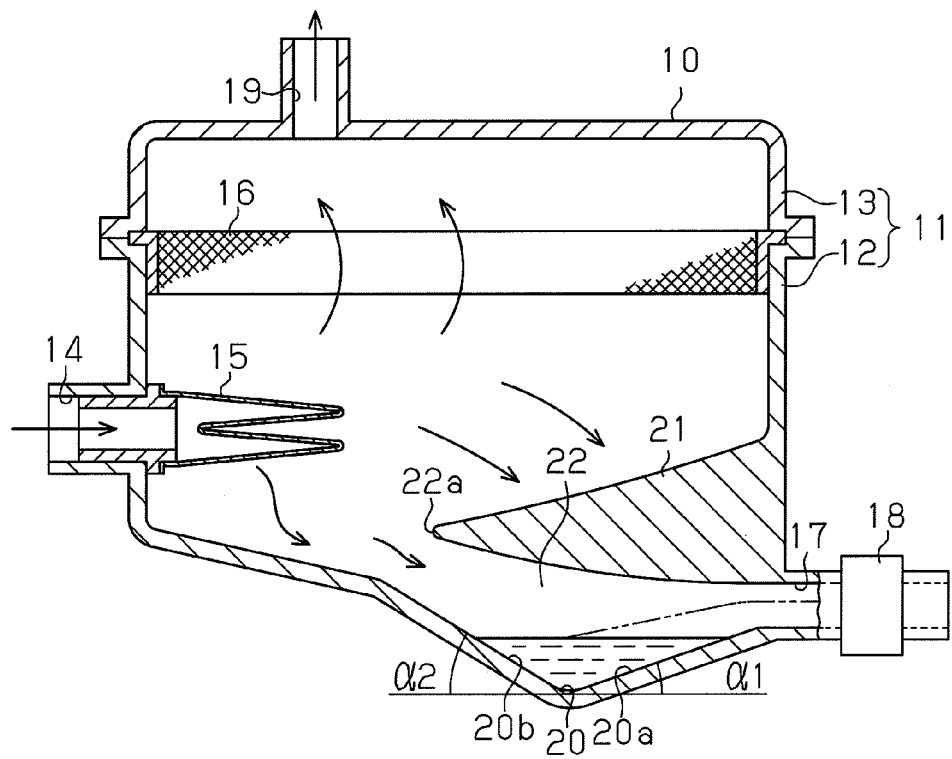
FIG. 6 is a cross-sectional view illustrating a gas-liquid separator of a modification.

As shown in FIG. 6, the opening 22a of the gas passage 22 may be widened, and the gas passage 22 may be gradually narrowed toward the discharge port 17. This structure allows a great amount of hydrogen to be drawn into the gas passage 22, and increases the flow rate of hydrogen in the gas passage 22 toward the discharge port 17. Thus, the product water in the water retaining portion 20 is efficiently discharged.

Figure 7:
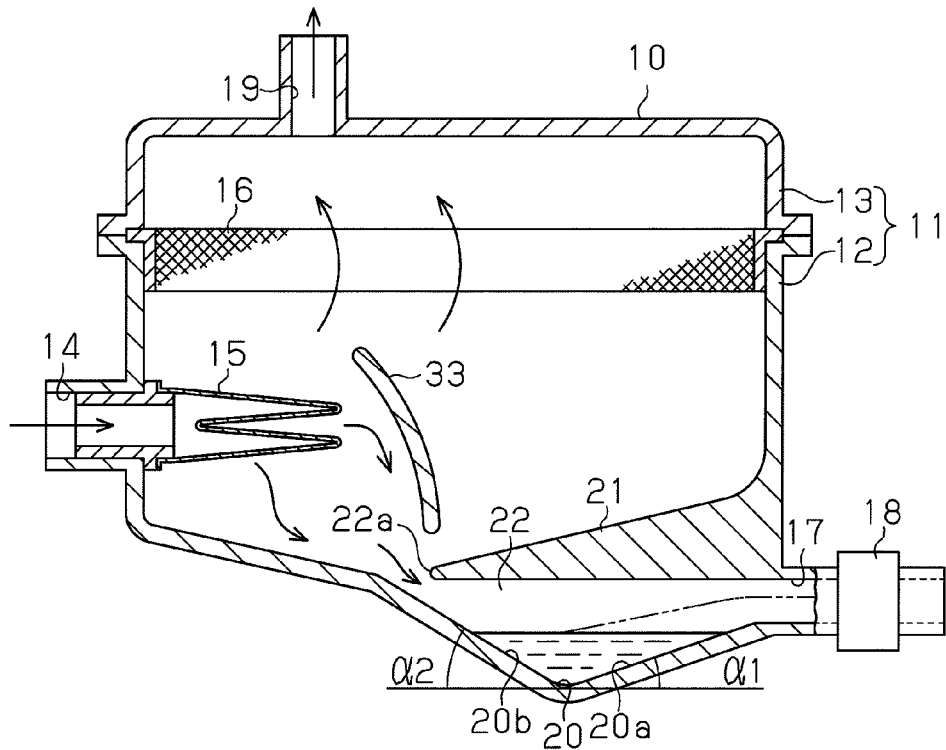
FIG. 7 is a cross-sectional view illustrating a gas-liquid separator of another modification.

As shown in FIG. 7, a guide wall 33 may be provided between left and right side walls of the case 11 to face the inlet 14. The guide wall 33 is designed to guide spurted hydrogen toward the opening 22a of the gas passage 22. This allows a great amount of hydrogen to flow into the gas passage 22, thereby efficiently discharging product water.

Figure 8:
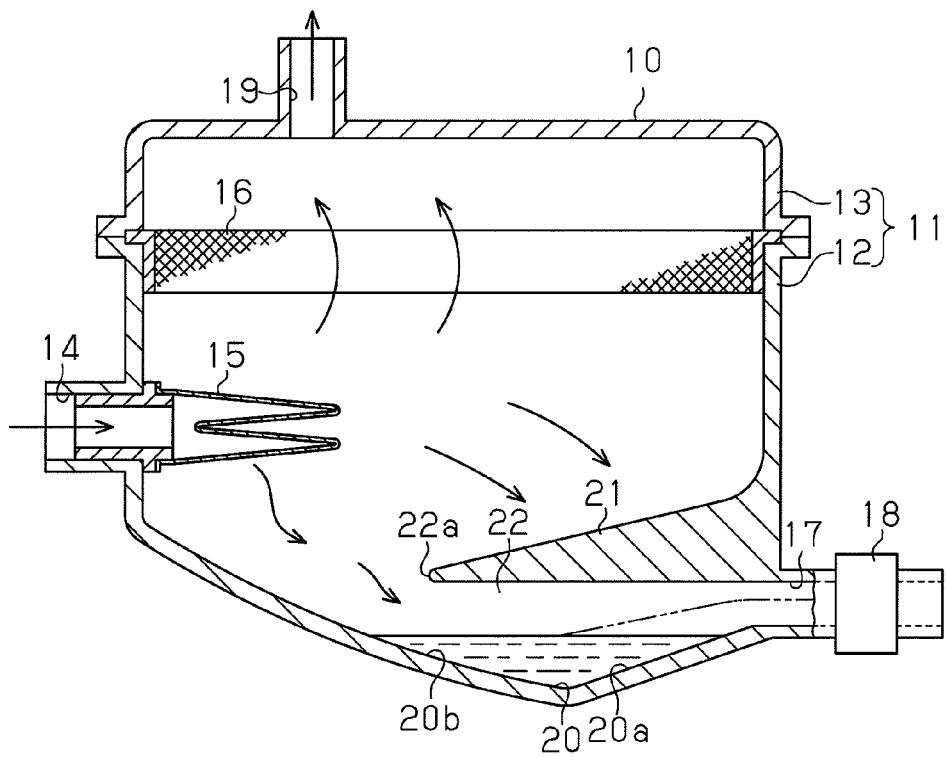
FIG. 8 is a cross-sectional view illustrating a gas-liquid separator of yet another modification.

As shown in FIG. 8, the bottom wall of the case 11 of the gas-liquid separator 10 may be formed as a large arc. This increases the amount of product water retained in the water retaining portion 20.

A check valve preventing backflow of hydrogen from the circulation pump 3 to the outlet 19 may be located between the outlet 19 and the circulation pump 3. This almost certainly prevents hydrogen from flowing from the outlet 19 to the case 11, allowing hydrogen to be spurted from the inlet 14 at a high pressure.

Therefore, the present examples and embodiments are to be considered as illustrative and not restrictive and the invention is not to be limited to the details given herein, but may be modified within the scope and equivalence of the appended claims.

The invention claimed is:

1. A gas-liquid separator of a fuel cell system, the gas liquid separator comprising:
   a housing;
   an inlet of the housing connected to a hydrogen discharge portion of a cell stack of the fuel cell system;
   an outlet of the housing connected to a hydrogen introduction portion of the cell stack;
   a product water separating member provided within the housing and located between the inlet and the outlet, the product water separating member extending in a width direction of the housing so as to divide the housing into an upper portion and a lower portion, wherein the outlet is provided in the upper portion of the housing and the inlet is provided in the lower portion of the housing;
a discharge port of the housing located below the product water separating member, the discharge port being used to discharge product water;
a discharge valve for opening and closing the discharge port;
a water retaining portion provided within the housing and located at a position lower than the discharge valve, the water retaining portion being continuous to the discharge port; and
a discharge portion for discharging product water retained in the water retaining portion;
wherein the discharge portion includes a gas passage; an upward inclination surface formed in a portion of the bottom of the water retaining portion, the upward inclination surface is inclined upward from a position closer to the inlet toward the discharge port; and a downward inclination surface formed in a portion of the bottom of the water retaining portion, the downward inclination surface is inclined downward from a position closer to the inlet toward the upward inclination surface.

2. The gas-liquid separator according to claim 1, wherein the gas passage is formed in an upper portion of the water retaining portion by providing a cover portion covering the water retaining portion from above, and wherein the gas passage extends from a position closer to the inlet and is continuous to the discharge port.

3. The gas-liquid separator according to claim 1, wherein the inclination angle of the upward inclination surface relative to the horizontal plane is less than the inclination angle of the downward inclination surface relative to the horizontal plane.

4. The gas-liquid separator according to claim 3, wherein the inclination angle of the upward inclination surface is 20 degrees, and the inclination angle of the downward inclination surface is 30 degrees.

5. The gas-liquid separator according to claim 1, wherein a sheet is provided in the water retaining portion, and wherein the sheet is pulled up from the bottom surface of the water retaining portion by spurting pressure of hydrogen spurted from the inlet, thereby forcing product water in the water retaining portion toward the discharge port.

6. The gas-liquid separator according to claim 1, wherein a drain portion that can be selectively opened and closed is provided at the bottom of the water retaining portion.

7. The gas-liquid separator according to claim 1, wherein the gas passage extends from a position closer to the inlet to the discharge port, and wherein the opening of the gas passage is widened, and the gas passage is gradually narrowed toward the discharge port.

8. The gas-liquid separator according to claim 1, wherein a guide wall is provided between a pair of side walls of the housing, the guide wall facing the inlet.

9. The gas-liquid separator according to claim 1, wherein the bottom of the housing is formed as an arc.

* * * * *